July 10, 1945.　　P. R. HORNBROOK　　2,380,311
CONVEYING APPARATUS
Filed July 22, 1943　　3 Sheets-Sheet 1
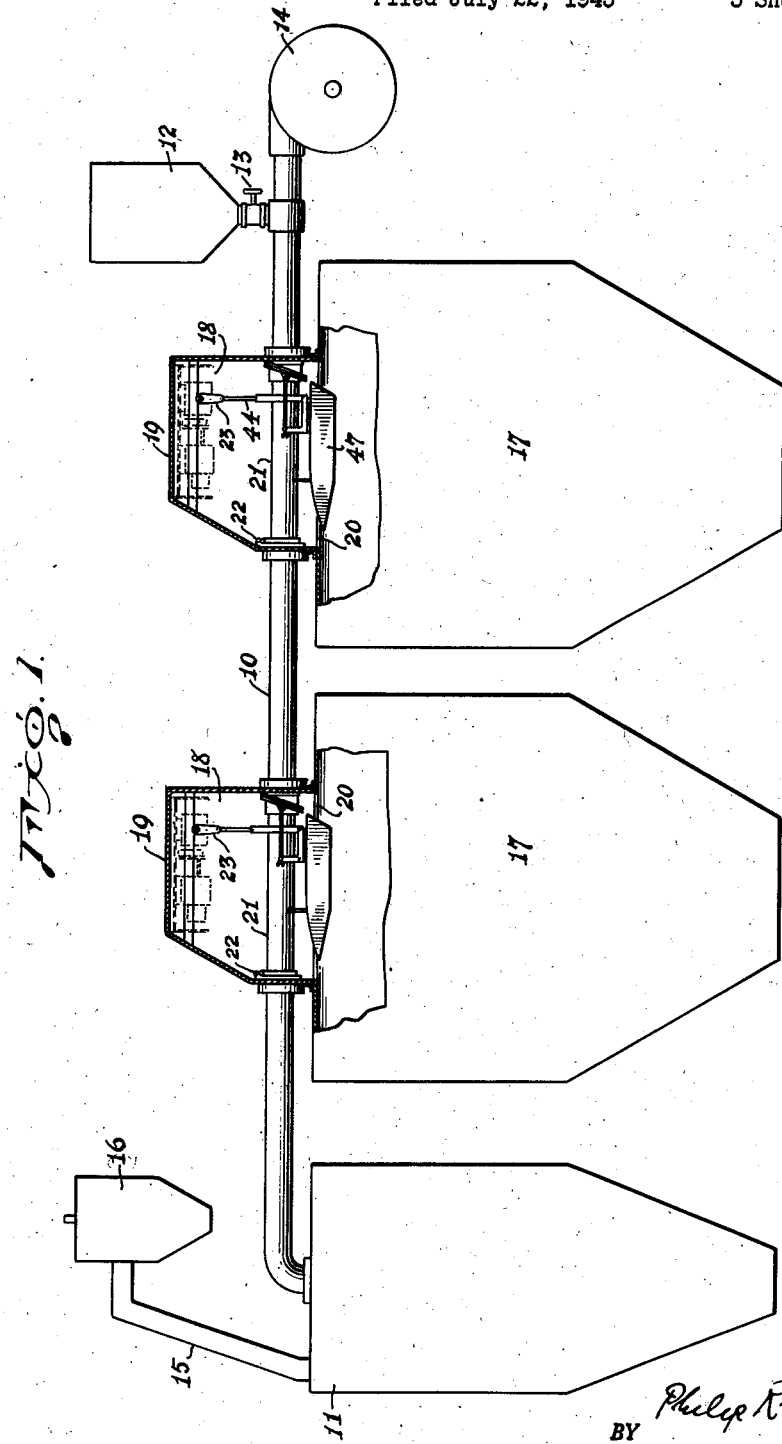
INVENTOR.
Philip R. Hornbrook
BY
Pennie Davis Marvin Edmonds
attorneys

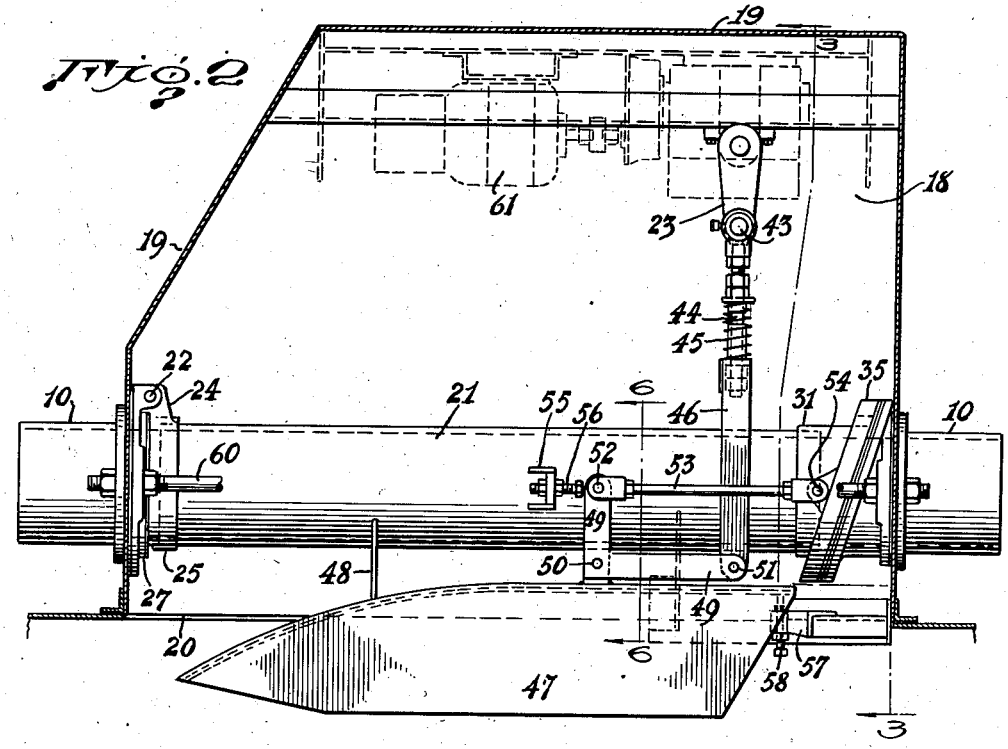
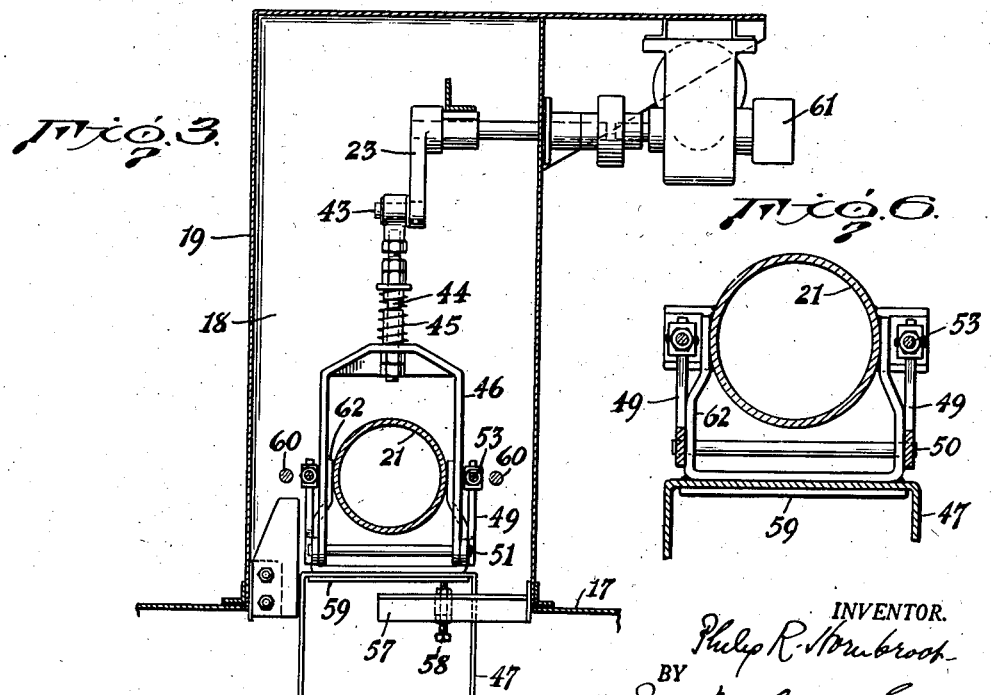

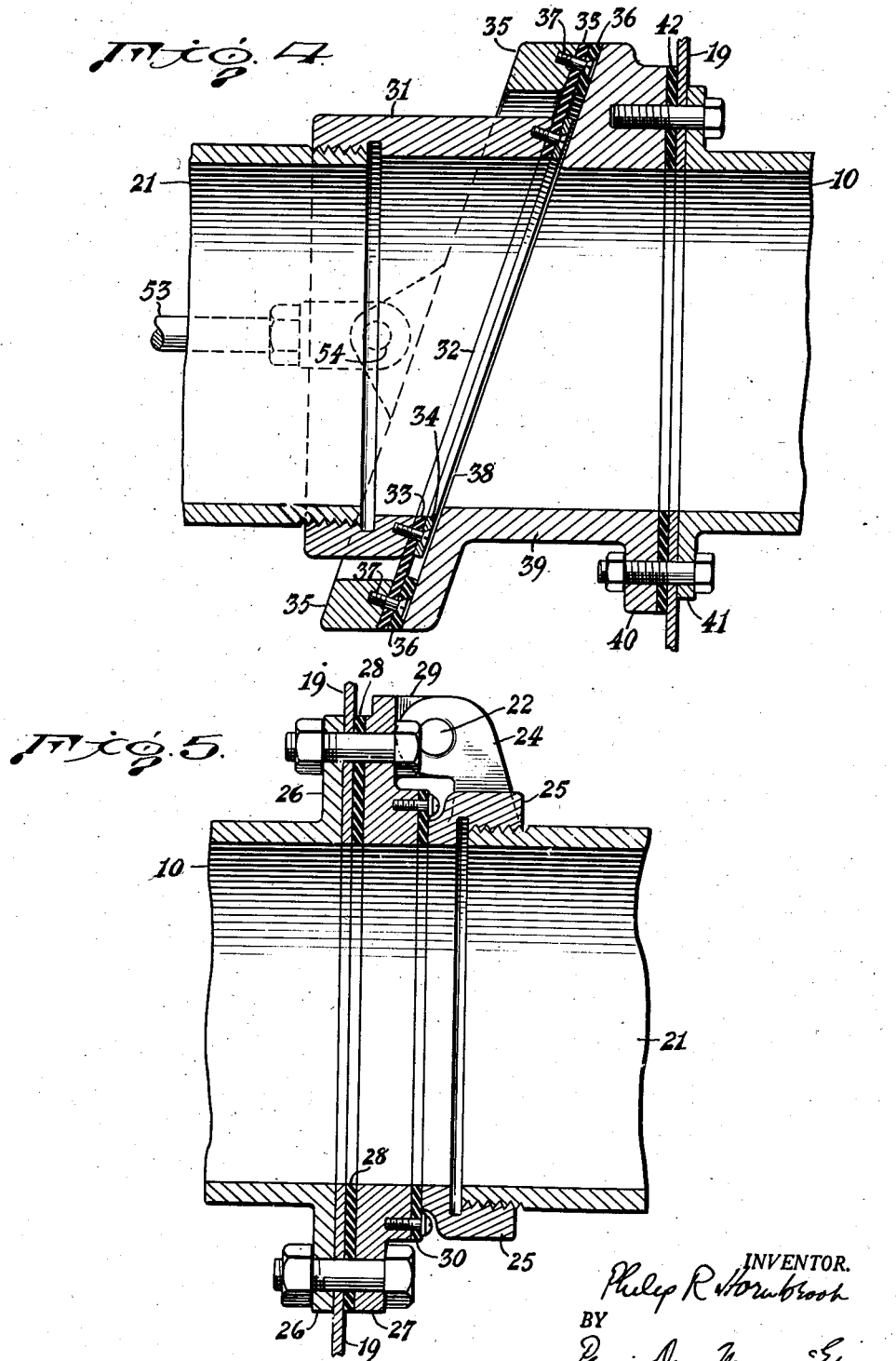

Patented July 10, 1945

2,380,311

UNITED STATES PATENT OFFICE 2,380,311

CONVEYING APPARATUS

Philip R. Hornbrook, Allentown, Pa., assignor to Fuller Company, Catasauqua, Pa., a corporation of Delaware Application July 22, 1943, Serial No. 495,720

9 Claims. (Cl. 302—28)

This invention relates to pneumatic conveying apparatus for pulverulent, granular and crushed material, and of the type which includes a plurality of receivers connected by a common conduit to a source of material supply, and a positive-pressure means for maintaining the necessary air flow through the conduit to the receivers to carry a mixture of air and material. The new system is of general utility, but for purposes of explanation, its use in connection with the handling of coal from the crusher to the receivers or storage bins will be described.

Heretofore it has been the practice to construct the system for conveying coal from a central point to a plurality of spaced points with a single conduit having a positive-pressure means at one end to maintain the necessary air flow to carry the material to the most remote receiver. Each receiver is connected to the single conduit by a suitable pipe line and communication between the single conduit and each connecting pipe line is controlled by a positive acting valve which, when moved to connect its particular receiver with the conduit, directs the entire flow of material and entraining air into the receiver.

A dust collector having suitable means for maintaining a reduced pressure therein is connected through suitable exhaust conduits with each of the receivers to remove the entraining air from the receivers when they are connected through their respective valves to the single conduit for filling.

The present invention is, accordingly, directed to provision of apparatus for conveying pulverulent, granular and crushed material in which material is caused to flow through a single conduit by a differential of pressure to one of a plurality of receivers adapted to be selectively connected to the conduit, the new apparatus including novel means to divert the material to the selected receiver in a manner to deposit the material therein while maintaining the flow of entraining air from the receiver through the single conduit.

The apparatus of the invention comprises a single conduit having a positive-pressure means connected to one end in order to maintain a differential of pressure in the conduit and cause a flow of air and material therethrough. The end of the conduit remote from the positive-pressure means is connected to the upper portion of a receiver.

A plurality of additional receivers are connected to the single conduit in advance of the receiver at the terminal end, and the openings from the single conduit to the receivers are controlled by motor operated valves which prevent the entrance of material to the receiver when in their closed position.

The several additional receivers are normally shut off from the conduit, but the material may be diverted to a selected receiver by swinging to one side a section of the conduit adjacent that receiver and, at the same time, bringing deflecting means carried by the conduit section to a position in which it diverts the flow from the fixed portion of the conduit into the receiver.

The velocity of the stream of air and material is temporarily reduced when material is being diverted into any one of the receivers and the material falls from suspension and is deposited in the receiver, while the entraining air flows back into the single conduit and eventually to the dust collector.

Each diverting means for controlling the flow of material to an intermediate receiver is remotely controlled and comprises a section of the main conduit which is pivotally mounted at one end and has a retractable sealing means at its other end for sealing that end to the adjacent end of a fixed portion of the main conduit. The diverting means is operated by a motor and in the initial action of the latter to cause the means to divert material, the sealing means is first retracted to break the seal and, thereafter, the pivoted conduit section is swung upward in a vertical plane. A deflector mounted on the movable section of the conduit is, at the same time, raised to a position in which it deflects into the receiver, material issuing from the fixed portion of the conduit. The air from which the entrained material has been deposited within the receiver passes out of the receiver and enters the open end of the conduit beyond the pivoted section. The air continues through the main conduit to the terminal receiver through which it flows into the dust collector.

For a better understanding of the invention, reference may be had to the accompanying drawings in which Fig. 1 is an elevation partly in section and with parts broken away to illustrate the diverting mechanism;

Fig. 2 is an elevation partly in section showing one of the diverting mechanisms in detail;

Fig. 3 is a section taken along line 3—3 of Fig. 2;

Fig. 4 is a fragmentary vertical section of the forward end of the movable section of conduit;

Fig. 5 is a fragmentary vertical section of the pivoted end of the movable section of conduit; and Fig. 6 is a section taken along line 6—6 of Fig. 2.

Referring now to the drawings, the apparatus illustrated will be seen to include a single conveying line or conduit 10, terminating at one end in the upper portion of a receiver 11. Material from storage means 12 may be delivered to the conduit 10 upon operation of valve 13 and carried through the conduit 10 by the flow of air from positive-pressure means 14. The air from the blower 14 entrains the material and carries it at high velocity through the conduit 10 to the receiver 11 where, due to a reduction in velocity, the material falls from the entraining air. After deposit of the material therefrom, the air flows on through conduit 15 to a dust collector 16 from which the air escapes to the atmosphere.

The material being conveyed may be diverted to any one of a number of receivers 17 disposed along the conduit 10 in advance of the terminal receiver 11, by the operation of diverting means generally designated 18. Each diverting means comprises an air-tight housing 19 mounted on the top of a receiver 17 and in communication with the interior of the receiver through an opening 20 in the top of the latter. Within the housing 19 is a section 21 of conduit 10 which is mounted to be swung in a vertical plane about a pivot pin 22 by means of a motor operated crank arm 23. The conduit section 21 is supported on the pin 22 by an ear 24 extending from an annular seat 25 threaded on the adjacent end of conduit section 21. Beyond the end of section 21, main conduit 10 is provided with a flange 26 and an annular member 27 is bolted to the flange, with a gasket 28 of fiber, rubber, or other suitable material, between the two parts. Pivot pin 22 is mounted in ears 29 which are integral with the annular member 27. When section 21 is in conveying position, the face of seat 25 bears tightly against a gasket 30 mounted on the adjacent end of the annular member 27.

Threaded on the free end of conduit section 21 is a cylindrical member 31, the free face 32 of which lies in a plane inclined to the longitudinal axis of section 21. A flexible annular member 33 of rubber or like material is held against the free face 32 by a ring 34 secured to member 31 by suitable means. The outer diameter of member 33 is substantially greater than that of member 31 and secured to one face of the projecting portion of member 33 is an annular backing member 35 which encircles the member 31 and is spaced from the periphery thereof. A sealing gasket 36 is mounted on the opposite face of the projecting portion of member 33; and the member 33, the gasket, and the backing member 35 are secured together by fastening means, such as screws 37.

When the movable conduit section 21 is in conveying position, the gasket 36 bears against the inclined face 38 of a cylindrical member 39, which is secured on the inner wall of housing 19 in alignment with the opening into the housing to which the main conduit 10 leads. The member 39 is provided with one or more lugs 40 by which it may be secured by bolts or the like to a flange 41 on the end of the main conduit 10. The connecting means pass through openings in the wall of housing 19 and a gasket 42 is interposed between member 39 and the housing wall to make an air-tight seal.

A pin 43 is mounted in the free end of crank arm 23 and on the pin is mounted a connecting rod 44 which is adjustable in length. A spring 45 encircles the rod 44 and bears at its lower end against a stirrup 46 which is mounted on the lower end of rod 44 and has a pair of arms extending downwardly on either side of conduit section 21.

A deflector 47 of appropriate shape is mounted on the under side of conduit section 21 by struts 48, and a pair of bell cranks 49, one on either side of conduit section 21, are pivoted on a pin 50 mounted on the deflector. The horizontal arm of each bell crank is pivotally connected to the lower end of one of the arms of stirrup 46 at 51 while the vertical arms of the bell cranks are pivoted at 52 to the ends of connecting rods 53. The other end of each connecting rod 53 is pivotally secured to a pin 54 mounted in a lug on the annular backing member 35.

Mounted on each side of the conduit section 21 adjacent the pivot 52 is a bracket 55 in which is threaded an adjustable stop screw 56. An arm 57 projecting inwardly from the wall of housing 19 carries an adjustable stop screw 58 adapted to bear against a reinforcing plate 59 secured against the under surface of the deflecting means.

Housing 19 is stiffened by rods 60 which extend through the housing walls and through the end flanges 26 and 41 of the main conduit sections abutting those walls. Crank arm 23 is mounted on the shaft of a motor 61 supported outside the housing and the motor may be controlled remotely or otherwise. To strengthen the construction, the deflector 47 is secured to the conduit section 21 by a U-shaped member 62 in the legs of which the pivot pin 50 is mounted.

In the operation of the apparatus, blower 14 forces air at high velocity through conduit 10 and, upon opening of valve 13, the material to be conveyed flows from the supply bin 12 into conduit 10 and is entrained in the air stream. The entrained material is carried through the conduit 10 to the terminal receiver 11, in which the material is deposited, while the air, together with any dust remaining in suspension, flows on through conduit 15 into dust collector 16, where the suspended particles are removed and the air is allowed to escape to the atmosphere.

When the terminal receiver 11 has been filled to the desired level, the motor 61 of the diverting means of the next adjacent receiver is operated to cause its crank arm 31 to swing in a clockwise direction. Connecting rod 44 and stirrup 46 are likewise raised and bell cranks 49 are swung on their pivot 50. The swinging of the bell cranks causes connecting rods 53 to move to the left, as illustrated in Fig. 2, and the rods pull the backing member 35 with them until the sealing gasket 36 is moved free of the face 38 of the cylindrical member 39. This movement of backing member 35 is accompanied by flexure of the annular member 33 and, when gasket 36 is free from face 38, the seal between the free end of conduit section 21 and the adjacent end of conduit 10 is broken. The movement of the rods 53 continues until the vertical arms of the bell cranks engage the stop screws 56, whereupon the bell cranks remain fixed relative to section 21 and further movement of the crank arm 23 causes conduit section 21 and its associated parts to swing in a counter-clockwise direction about pivot 22. In the swinging of the conduit section, the annular seat member 25 moves away from gasket 30 to permit access of air into the section of the main conduit 10 beyond the adjacent end of conduit section 21.

The movement of the conduit section 21 continues until deflector 47 is brought up into position in front of the end of conduit 10 leading into the housing. The entrained material issuing from conduit 10 thereupon impinges upon plate 59 and is deflected therefrom through the opening 20 into receiver 17. The greatly increased cross-sectional area of the receiver over that of the conduit results in a drop in the velocity of the entrained air and the material drops therefrom toward the bottom of the receiver by gravity. Receiver 17 and housing 19 are air-tight and the air, from which the material has been separated, accordingly, escapes through the space between member 25 and 27 into conduit 10 beyond the receiver and flows on through the conduit. When receiver 17 has been filled to the desired level, crank arm 23 is lowered and the conduit section is returned to its normal position with its axis coincident with that of main conduit 10. As the conduit section moves down to its position of rest, its ends are sealed to the adjacent fixed portions of the main conduit to permit the flow of material through the conduit section without escape into the housing or receiver.

I claim:

1. In pneumatic conveying apparatus, a conduit through which material is conveyed by a fluid under pressure, said conduit having a pivoted section intermediate its ends, said pivoted section normally being sealed at its ends to adjacent sections of the conduit to form a continuous passage for material, a receiver adjacent said pivoted section, a fluid-proof housing enclosing said pivoted section and communicating with said receiver, and means connected to said pivoted section acting initially to break the seal between one end of the pivoted section and the adjacent section of the conduit, and upon further movement to swing the pivoted section out of the axis of the adjacent sections of the conduit, whereby entrained material may be deposited in said receiver and fluid flow maintained throughout said conduit simultaneously.

2. In pneumatic conveying apparatus, a conduit through which material is conveyed by a fluid under pressure, said conduit having a pivoted section intermediate its ends, said pivoted section normally being sealed at its ends to adjacent sections of the conduit to form a continuous passage for material, a receiver adjacent said pivoted section, a fluid-proof housing enclosing said pivoted section and communicating with said receiver, and means connected to said pivoted section acting initially to break the seal between one end of the pivoted section and the adjacent section of the conduit, and upon further movement to swing the pivoted section out of the axis of the adjacent sections of the conduit, a deflector mounted on said pivoted section and movable therewith to a position opposite one of the adjacent sections of the conduit to deflect a moving stream of entrained material emitted from said section into the receiver.

3. In pneumatic conveying apparatus, a conduit through which material is conveyed by a fluid under pressure, said conduit having a pivoted section intermediate its ends, said pivoted section normally being sealed at its ends to adjacent sections of the conduit to form a continuous passage for material, a receiver adjacent said pivoted section, a fluid-proof housing enclosing said pivoted section and communicating with said receiver, and means connected to said pivoted section acting initially to break the seal between one end of the pivoted section and the adjacent section of the conduit, and upon further movement to swing the pivoted section out of the axis of the adjacent sections of the conduit, whereby entrained material may be deposited in said receiver and fluid flow maintained throughout said conduit simultaneously, the actuating means for the pivoted section initially moving a portion of said pivoted section, in translation, away from the adjacent conduit section a distance sufficient to break the seal therewith.

4. In pneumatic conveying apparatus, a conduit through which material is conveyed by a fluid under pressure, said conduit having a pivoted section intermediate its ends, said pivoted section normally being sealed at its ends to adjacent sections of the conduit to form a continuous passage for material, a receiver adjacent said pivoted section, a fluid-proof housing enclosing said pivoted section and communicating with said receiver, and means connected to said pivoted section acting initially to break the seal between one end of the pivoted section and the adjacent section of the conduit, and upon further movement to swing the pivoted section out of the axis of the adjacent sections of the conduit, whereby entrained material may be deposited in said receiver and fluid flow maintained throughout said conduit simultaneously, the means to break the seal between the pivoted section and the adjacent section of the conduit and to swing the pivoted section out of the axis of the adjacent sections of the conduit including a bell crank pivoted on said pivoted section, stop means mounted on said pivoted section adjacent an arm of said bell crank, means connecting an arm of said bell crank to a sealed end of said pivoted section, operating means, and means connecting the other arm of said bell crank to said operating means whereby movement of said operating means rotates said bell crank until it meets said stop means and said first connecting means has broken the seal at a sealed end of said pivoted section, subsequent motion of said operating means swinging said pivoted section out of the axis of said conduit.

5. In means to control the flow of fluid entrained material, a conduit having a pivoted section intermediate its ends, a member mounted on one end of said pivoted section and having a flexible gasket extending outwardly therefrom and cooperating with the end of the section adjacent thereto to form a seal, an annular member mounted on the flexible gasket and spaced outwardly from the member at said end of the pivoted section, actuating means connected to said annular member, means for operating said actuating means to initially move the annular member axially of said conduit away from the adjacent section of the conduit to break the seal, and thereafter to swing the pivoted section out of the axis of said conduit.

6. In means to control the flow of fluid entrained material, a conduit having a pivoted section intermediate its ends, a member mounted on one end of said pivoted section and having a flexible gasket extending outwardly therefrom and cooperating with the end of the section adjacent thereto to form a seal, an annular member mounted on the flexible gasket and spaced outwardly from the member at said end of the pivoted section, the flexible gasket and the annular member mounted thereon and the cooperating end of the adjacent section of the conduit extending at an angle oblique to the axis of the conduit, actuating means connected to said annular member, means for operating said actuating means to initially move the annular member axially of said conduit away from the adjacent section of the conduit to break the seal, and thereafter to swing the pivoted section out of the axis of said conduit.

7. In means to control the flow of material, a conduit having a movable section, means pivotally mounting said movable section so that it may be swung out of the axis of the conduit, one end of the pivoted section and the end of the section of the conduit adjacent thereto having cooperating sealing means, each provided with annular sealing surfaces at an angle oblique to the axis of the conduit, an axially-movable member connected to the sealing means at said one end of the pivoted section, actuating means for moving said member axially of the conduit and for swinging the pivoted section, and means for operating said actuating means to initially move said member axially of the conduit away from the end of the adjacent section of the conduit to break the seal between said cooperating sealing surfaces, and thereafter to swing the pivoted section out of the axis of the conduit.

8. In means to control the flow of material, a conduit having a movable section, means pivotally mounting said movable section so that it may be swung out of the axis of the conduit, a flexible sealing flange secured to the other end of the pivoted section, said flange having a sealing surface cooperating with a sealing surface at the end of the section of the conduit adjacent thereto, said sealing surfaces being at an angle oblique to the axis of the conduit, an annular member surrounding said other end of the pivoted section and secured to said flange, actuating means for moving said annular member axially of the conduit and for swinging the pivoted section, and means for operating said actuating means to initially move said annular member, and the flange secured thereto, axially of the conduit away from the end of the adjacent section of the conduit to break the seal between the cooperating sealing surfaces, and thereafter to swing the pivoted section out of the axis of the conduit.

9. In means to control the flow of material as set forth in claim 8, in which the movable section is pivoted adjacent one end thereof, and in which the actuating means for moving the annular member axially of the conduit and for swinging the movable section includes spring means normally urging the annular member in a direction to cause the sealing surface of the flexible flange to bear against the cooperating sealing surface at the end of said section of the conduit adjacent thereto.

PHILIP R. HORNBROOK.